Figure 1:
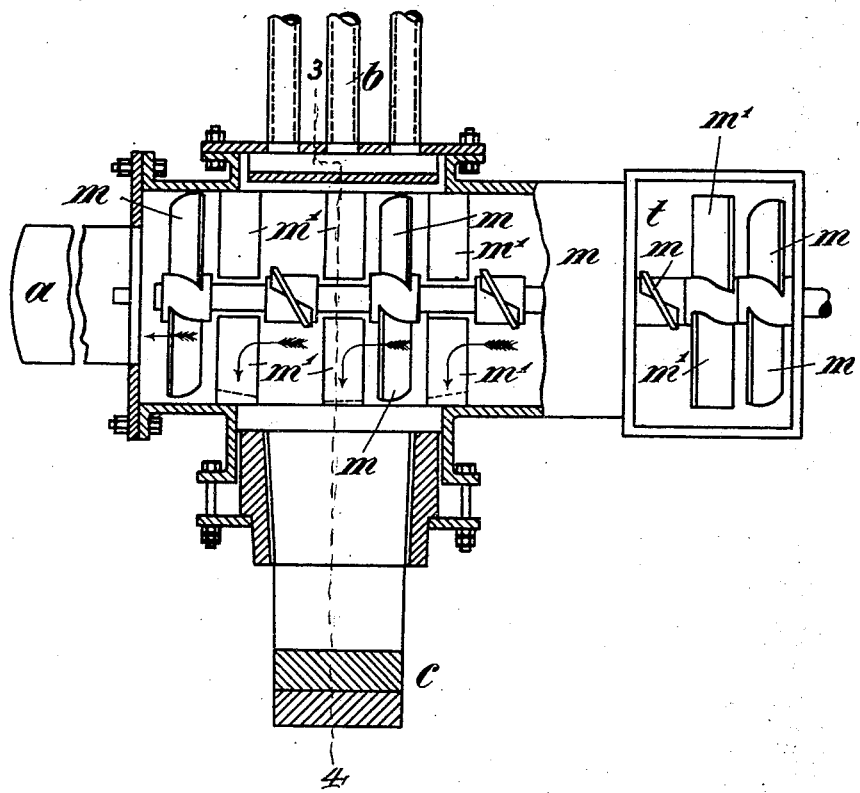

No. 653,781.  
C. SCHLICKEYSEN.  
BRICK, TILE, OR PIPE MOLDING MACHINE.  
(Application filed Mar. 17, 1900.)  
(No Model.)  
Patented July 17, 1900.

WITNESSES:  
Isabella Waldron

INVENTOR  
Carl Schlickeysen  
BY Richards & Co  
ATTORNEYS

UNITED STATES PATENT OFFICE.

CARL SCHLICKEYSEN, OF RIXDORF, GERMANY.

BRICK, TILE, OR PIPE MOLDING MACHINE.

SPECIFICATION forming part of Letters Patent No. 653,781, dated July 17, 1900.

Application filed March 17, 1900. Serial No. 9,091. (No model.)

*To all whom it may concern:*

Be it known that I, CARL SCHLICKEYSEN, manufacturer, a subject of the King of Prussia, German Emperor, residing at Rixdorf, near Berlin, in the Kingdom of Prussia, German Empire, have invented certain new and useful Improvements in Brick, Tile, or Pipe Molding Machines, of which the following is a specification.

The brick, tile, and pipe molding machines of present construction with screw-shaped pressing-blades either have a press mold or die situated transversely in front of the cutter-shaft or several such molds which project from the casing of the pressing-blades. In the latter case the press molds or dies are so arranged that the pressure of the screw-blade is equally strong on each of the molds, and these are so formed internally that the clay columns entering the same are all subjected to one and the same degree of resistance, so that as much clay is pressed out of one mold as out of the others. Should the one mold offer greater resistance than the others, it is possible that no clay column would issue at all from the same, the whole of the clay issuing from the other or others that offer less resistance. Thus, for example, it would not be possible to press from one such lateral mold solid bricks and from another perforated bricks or tiles or pipes. With the press-mold situated transversely in front of the cutter-shaft a direct vertical pressure is exercised by the pressure-blades; but with the press-molds arranged laterally on the casing only an indirect back pressure is produced, which is caused by the fact that the clay in front which is pressed in that direction by the screw pressing-blades cannot issue at that point. The press consequently works with a somewhat-considerable loss of power, because the clay can only escape backward in the reverse direction to that of the screw pressing-blades around the periphery of the latter, so as to escape through the side press molds or dies.

The present invention has for its object to convert the said backward pressure into a lateral direct regulatable expelling pressure in order to effect in one and the same machine both lateral and forward expelling pressures acting quite independently of each other, so as to enable clay columns of different cross-sections and requiring different degrees of expelling pressure to be produced at one and the same time.

In order to make my invention more clear, I refer to the accompanying drawings, in which similar letters denote similar parts throughout both views, and in which—

Figure 2:
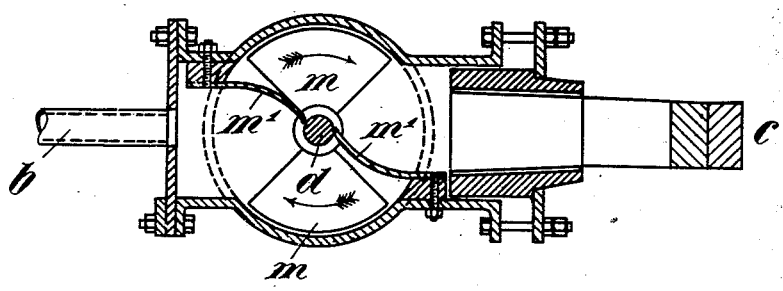

Figure 1 is a sectional plan of a horizontal brick, tile, or pipe molding machine constructed according to my invention. Fig. 2 is a vertical section in line 3 4 of Fig. 1.

The machine is provided first with a mold or die *a* in the direction of the cutter-shaft *d* and with two others arranged laterally of the shaft.

*m* represents screw-blades which propel the clay from the hoppers *t* by direct pressure to the front mold *a*.

*m'* represents special cutting and pressing blades, which are arranged between the screw-blades *m* and extend from the cutter-shaft to the surrounding casing or to the lateral press molds or dies in such manner, as indicated at the cross-section at Fig. 2, that they cause a corresponding broad portion of the clay situated between the successive blades *m* to be cut out and to be pushed along the surfaces of the said pressure-blades *m'* toward the molds. By means of the continuous mass of clay thus led off in a lateral direction a lateral pressure is produced whereby a column of clay is extruded through a lateral mold independently of the columns extruded through the other lateral molds. The cutters *m'* can be made wider or narrower and longer or shorter, and they may be made with a greater or less degree of inclination, according as circumstances may require, in order to cause such a quantity of clay to be propelled laterally to the mold as shall correspond with the sectional area of the latter. The cutters can also either only extend directly upward or downward, as shown at Fig. 2, or, as indicated by the arrow, Fig. 1, they can in addition extend parallel to the shaft to the right or to the left, so as to reach into the mouth of the mold. The press molds or dies can be arranged nearer to or farther from the said pressure-surfaces in order thereby to increase or decrease the amount of pressure exercised, so that by this means the action of each press-mold is rendered independent of the others and can be suited to the kind of manufacture which it is designed to produce. Also the molds can be changed at will, so long as they are arranged in accordance with what has been stated above, for producing the exact result required.

Of course a machine having three press-molds requires more clay than one with only one mold or two, and consequently the cutter-shaft requires to be driven at a greater speed in order to supply sufficient clay at the requisite pressure to each of the molds, so as to give the operatives at the cutting-table sufficient employment.

With very large brick or tile machines with only a single press mold or die in the direction of the cutter-shaft the extrusion of hollow and thin clay columns may cause some danger to the effectiveness and durability of the press in the event of there being too great a supply of material, and if the construction be defective or if the clay be too stiff the clay may be prevented from issuing, in which case rupture must take place. If, however, there be provided in addition to the mold for the hollow column one or more molds for solid brick columns in a lateral direction, these will act as a safety device for the machine, as should the hollow brick-mold become blocked the clay in issuing through the lateral mold or molds will effectually prevent any rupture of the machine.

Having now described my invention, what I desire to secure by Letters Patent of the United States is—

1. In a brick, tile and pipe molding machine, and in combination a casing, a hopper arranged at one end thereof, a shaft extending longitudinally of the casing, screw feeding and pressing blades disposed along said shaft, and molds arranged axially and laterally of the shaft opening into said casing, substantially as described.

2. In combination, a casing, a shaft, a hopper, molds disposed axially and laterally of the shaft, screw propelling-blades carried by the shaft and cutting and pressing blades secured to the casing and extending toward the shaft in between the propelling-blades, substantially as described.

In witness whereof I have hereunto set my hand in presence of two witnesses.

CARL SCHLICKEYSEN.

Witnesses:
  WOLDEMAR HAUPT,
  HENRY HASPER.